United States Patent [19]

Stewart

[11] Patent Number: 4,515,698

[45] Date of Patent: May 7, 1985

[54] LIQUID CLARIFYING APPARATUS AND METHODS

[76] Inventor: William E. Stewart, 12 Brow Hill Rd., Somers, Conn. 06071

[21] Appl. No.: 572,765

[22] Filed: Jan. 23, 1984

[51] Int. Cl.³ .............................................. B01D 21/06
[52] U.S. Cl. ..................................... 210/802; 210/521
[58] Field of Search ......................... 210/521, 522, 802

[56] References Cited

U.S. PATENT DOCUMENTS

| | | | |
|---|---|---|---|
| 3,951,817 | 4/1976 | Snyder | 210/521 |
| 3,997,444 | 12/1976 | McGivern | 210/521 X |
| 4,137,173 | 1/1979 | Jarvis et al. | 210/521 X |
| 4,346,005 | 8/1982 | Zimmermann | 210/521 X |

Primary Examiner—Thomas Wyse
Attorney, Agent, or Firm—McCormick, Paulding & Huber

[57] ABSTRACT

A clarifier module is contained within a conventional tank-type liquid clarifier having a rotary rake. The clarifier module has a settling region defined by a plurality of inclined parallel plates and a clear effluent chamber separated from the settling region by a partition. Slots in the partition provide communication between the settling region and the clear effluent chamber which contains a weir. Clear effluent is withdrawn from the chamber at a controlled rate and discharged externally of the clarifier tank.

24 Claims, 12 Drawing Figures

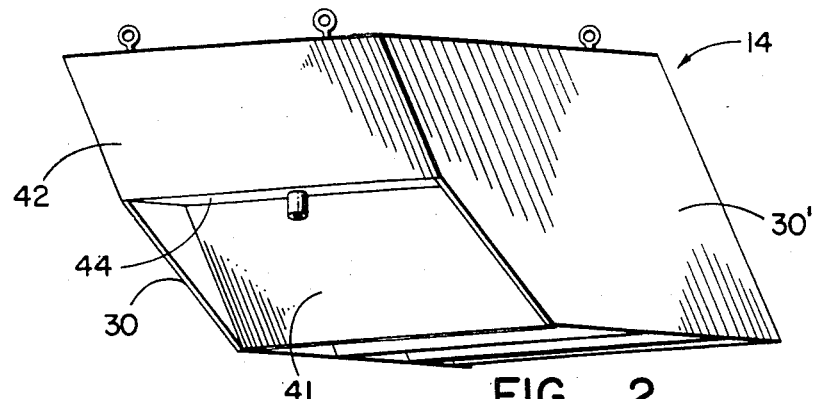
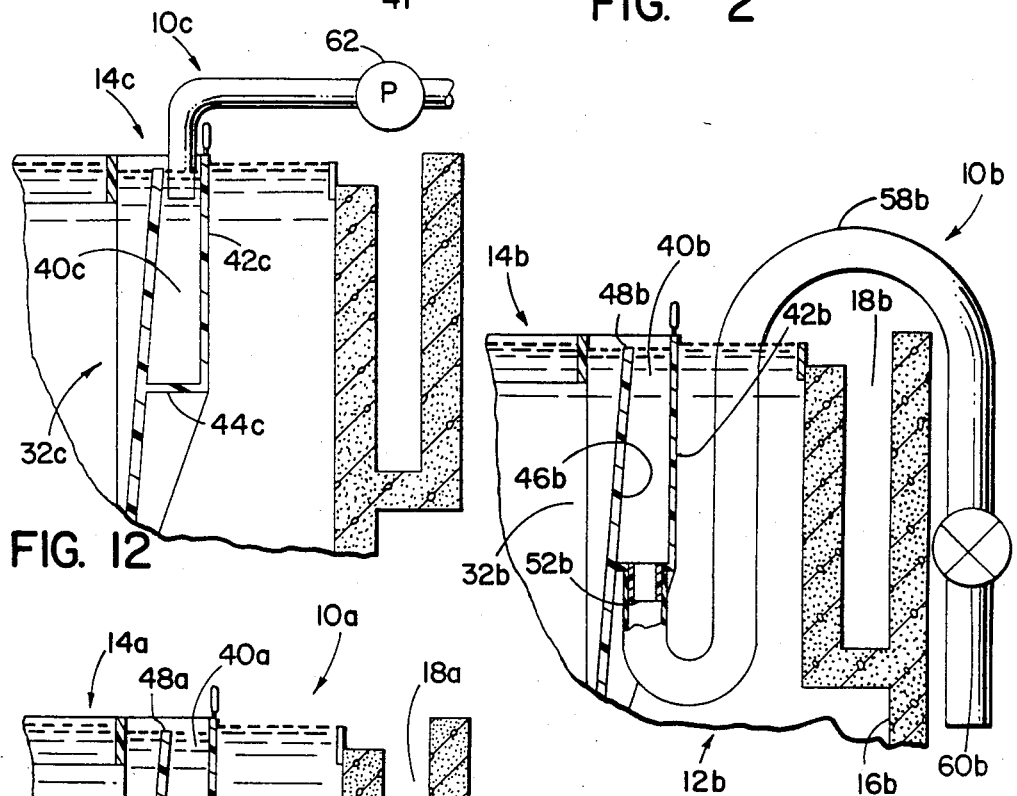

4,515,698

LIQUID CLARIFYING APPARATUS AND METHODS

BACKGROUND OF THE INVENTION

This invention relates in general to improvements in liquid clarifying apparatus and deals more particularly with improvements in existing clarifying or thickening apparatus and methods for increasing the effective capacity and/or performance of an existing clarifier or thickener. Clarifying apparatus of the type with which the present invention is concerned is used to separate suspended solids from liquids. A typical system may, for example, be used to clarify and recover waste process water and/or valuable solid waste material suspended therein. A conventional tank-type clarifier, which may be used in practicing the invention, may, for example, comprise a relatively large vessel or gravity settling tank for receiving effluent to be clarified and which may be conditioned with flocculents, in a manner well known in the art. The capacity of a conventional tank-type clarifier is a function of its surface area. Consequently, such clarifiers generally occupy considerable space. When it becomes necessary to increase the capacity or performance of such a system the usual procedure is to add one or more clarifying units to the existing system. However, such units are quite costly to purchase, install and maintain. Often, the space required to accommodate additional clarifying apparatus may not be available, even though expansion may be desirable.

Accordingly, it is the general aim of the present invention to provide improvements in liquid clarifying apparatus and more particularly improvements in existing clarifying or thickening apparatus and methods for increasing in the effective capacity and/or performance of an existing clarifying or thickening system without expanding or substantial altering of the existing system.

SUMMARY OF THE INVENTION

In accordance with the present invention, a liquid clarifier module is provided. At least one such clarifier module is utilized in combination with an existing clarifying apparatus which includes a tank for receiving and containing waste effluent, means for supplying waste effluent to the tank, means for discharging clarified effluent from the tank, and means for removing settled solids or sludge from a lower portion of the tank. The clarifier module, which is disposed within the tank, essentially comprises a plurality of parallel spaced apart and vertically inclined plates partially defining a settling region, means defining a clarified effluent chamber forward of the settling region, means separating the settling region from the chamber, means providing communication through the separating means between the settling region and a rear portion of the chamber, a weir positioned within the chamber and separating a front portion of the chamber from the rear portion thereof, and means for withdrawing clarified effluent from the front portion of the chamber and discharging it externally of the tank whereby to induce waste effluent flow through the clarifying module.

The clarifying module, positioned within the tank so that the weir is located below the surface of the waste effluent, is operated by withdrawing clarified effluent from the forward portion of the chamber and discharging it externally of the tank. The clarified effluent is preferably withdrawn at a controlled rate by pumping, siphoning or inducing gravity flow.

BRIEF DESCRIPTION OF THE DRAWINGS

FIG. 2 is a somewhat enlarged perspective view of the clarifier module shown in FIG. 1.

FIG. 10 is a somewhat enlarged fragmentary sectional view similar to FIG. 1 but illustrating another embodiment and method of the invention.

FIG. 11 is similar to FIG. 10 but illustrates still another embodiment and method of the invention.

FIG. 12 is also similar to FIG. 10 but illustrates yet another embodiment and method of the invention.

DETAILED DESCRIPTION OF PREFERRED EMBODIMENTS AND METHODS

Figure 1:
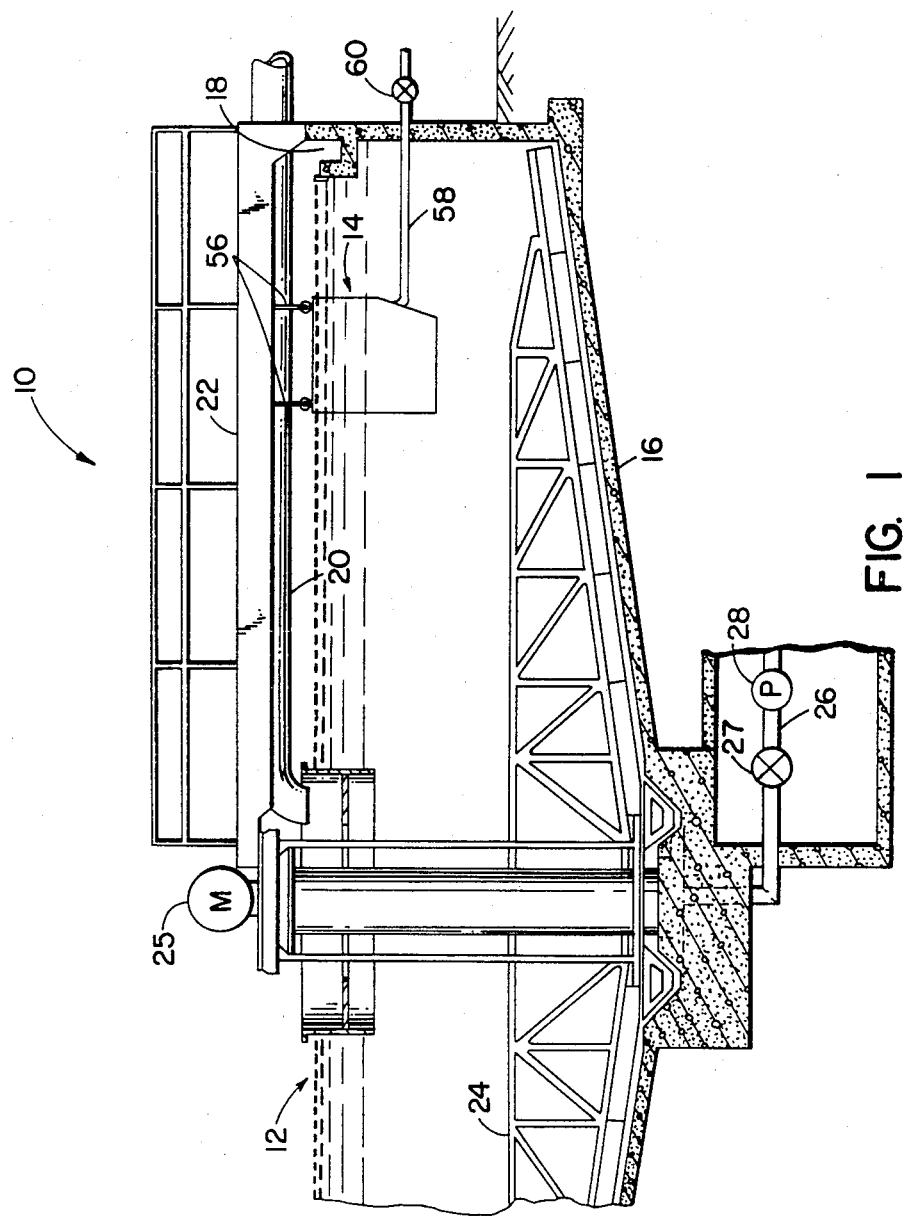
FIG. 1 is a somewhat schematic axial sectional view through a circular tank-type liquid clarifier containing a clarifier module and embodying the present invention and illustrating a method of the invention.

Turning now to the drawings, and referring first particularly to FIG. 1, a liquid clarifying apparatus embodying the present invention and illustrating a method of the present invention is shown somewhat schematically and indicated generally by the reference numeral 10. The illustrated apparatus 10 is suitable for use as a clarifier or thickener and may, for example, be used to clarify waste effluent, such as industrial waste water, to recover clarified effluent, for use as process water, and/or solids suspended in the waste effluent. It essentially comprises an existing clarifier or thickener, indicated generally at 12, and at least one clarifier module, designated generally by the numeral 14, and used in combination with the clarifier 12 to increase its effective capacity and performance, as will be hereinafter more fully discussed.

The illustrated liquid clarifier 12 is a conventional tank-type clarifier and has a concrete tank 16 for receiving and containing waste effluent. The tank is open at its upper end and includes a conically downwardly converging bottom. A circular overflow trough 18 surrounds the upper peripheral edge of the tank 16 for the collection of clarified effluent. Waste effluent is fed into a central portion of the tank 16 through a feed line or conduit 20 which, as shown, is supported on the underside of a bridge or catwalk 22. The illustrated clarifier 12 further includes a rotary rake 24 which has an associated drive mechanism 25 and which rotates in scraping relation to solid materials or sludge which collects at the bottom of the tank. The rake operates to move the settled solids or sludge toward the central portion or apex of the tank bottom where it is withdrawn from the tank through a drain line or conduit 26 which communicates with a lower portion of the tank and includes an associated control valve 27 and a pump 28.

The clarifier module 14 may be constructed from any suitable relatively inert material which resists corrosion and attack by the waste effluent to be treated. The presently preferred module 14 is constructed from polypropylene plastic sheet material joined in assembly by a thermo-welding process.

Considering the clarifier module 14 in further detail and referring now particularly to FIGS. 2-8, the illustrated module has a generally parallelepiped form and includes a pair of parallel, transversely spaced apart and vertically inclined sidewalls 30, 30'. The sidewalls are joined together by a longitudinally spaced series of upper cross members or baffles 34, 34 which extend transversely between upper portions of the sidewalls. A similar longitudinally spaced series of lower cross members or baffles 36, 36 extend transversely between and join the lower portions of the sidewalls 30, 30'.

Figure 5:
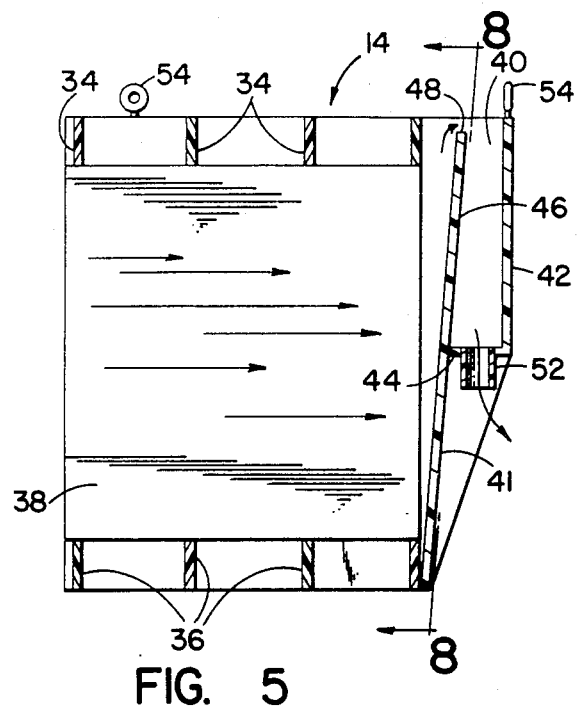
FIG. 5 is a sectional view taken along the line 5—5 of FIG. 4.
Figure 6:
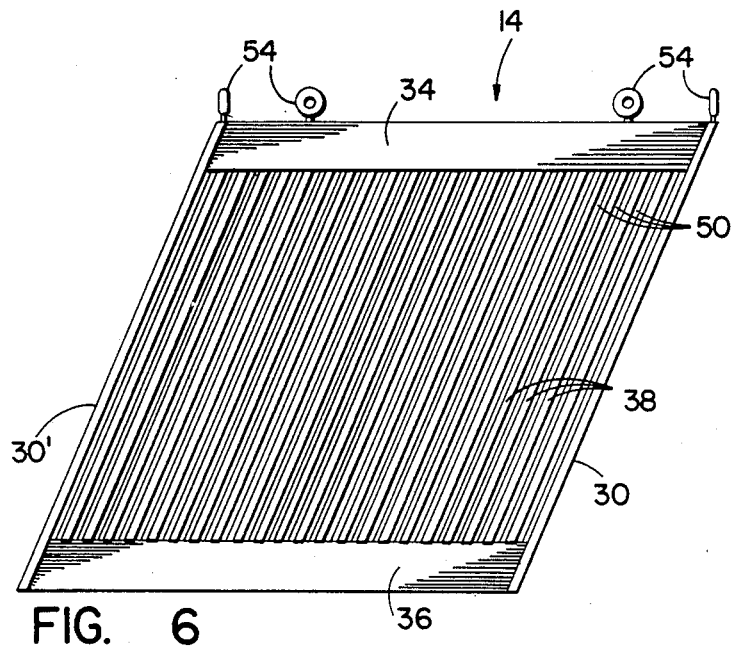
FIG. 6 is a rear view of the clarifier module.
Figure 7:
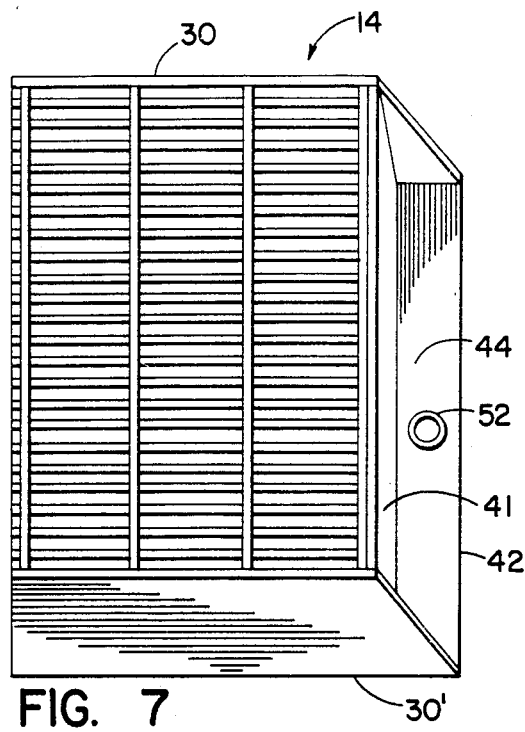
FIG. 7 is a bottom view of the clarifier module.
Figure 9:
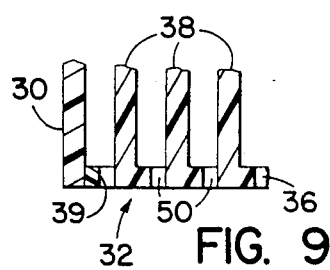
FIG. 9 is a somewhat enlarged fragmentary sectional view taken along the line 9—9 of FIG. 8.

A plurality of parallel transversely spaced apart and vertically inclined plates 38, 38 are disposed between the sidewalls 30, 30' in parallel relation thereto. The plates 38, 38 are attached to and extend between the upper and lower baffles, as best shown in FIGS. 5 and 6. The forward end portions of the plates 38, 38 are generally L-shaped, as viewed from above and as best shown in FIG. 9. The L-shaped forward end portions cooperate with each other and with the sidewall 30' to partially define a slotted partition 32 of parallelogram shape, further defined by a vertically disposed strip of material 39 attached to and extending along the inner surface of the sidewall 30. The slots in the partition 32 extend between the forward most upper and lower baffles 34 and 36 and are indicated by the numerals 50, 50. The plates 38, 38 cooperate with the sidewalls 30, 30' and the slotted partition 32 to define a settling region of the module 14, as will be hereinafter further discussed.

The slotted partition 32 and forward end portions of the sidewalls 30, 30' cooperate to partially define a clear effluent chamber 40 forward of the settling region. The chamber 40 is further defined by an inclined wall 41 joined at its lower end to the forward most lower baffle 36 and inclined forwardly and upwardly therefrom, a front wall 42 and a bottom wall 44 which is spaced a substantial distance above the lower edges of the sidewalls 30, 30'. It should be noted that the upper edges of the sidewalls 30, 30', the front wall 44, and the baffles 34, 34, are disposed within a common horizontal plane, as best shown in FIG. 5.

Figure 3:
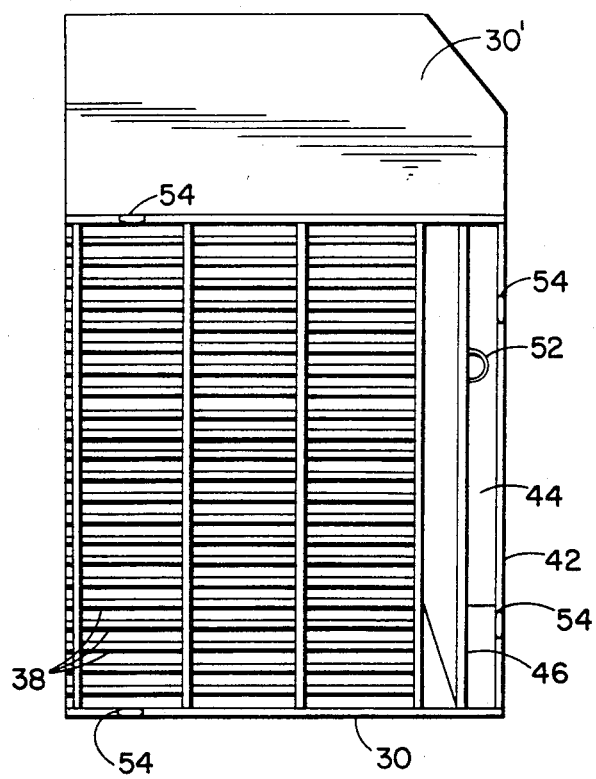
FIG. 3 is a somewhat further enlarged top view of the clarifier module.
Figure 4:
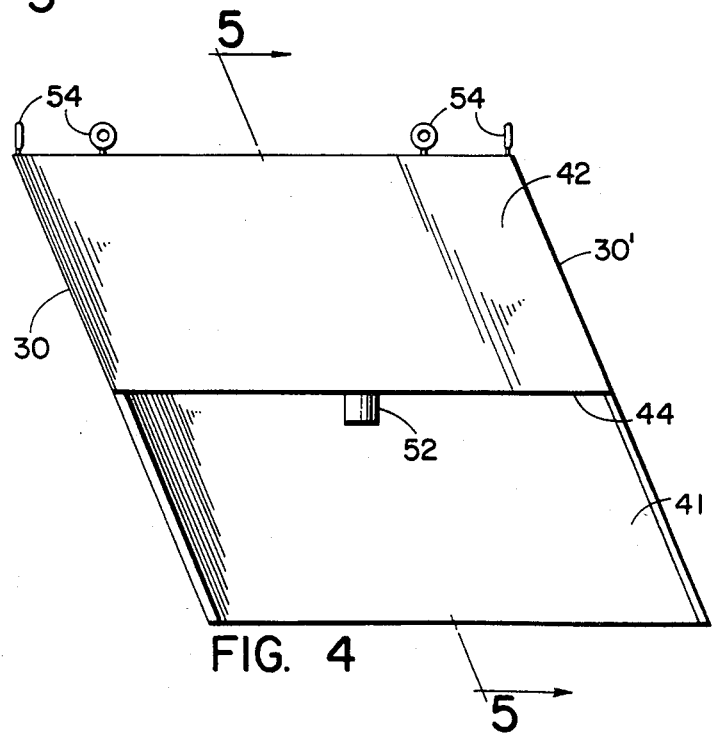
FIG. 4 is a front view of the clarifier module.
Figure 8:
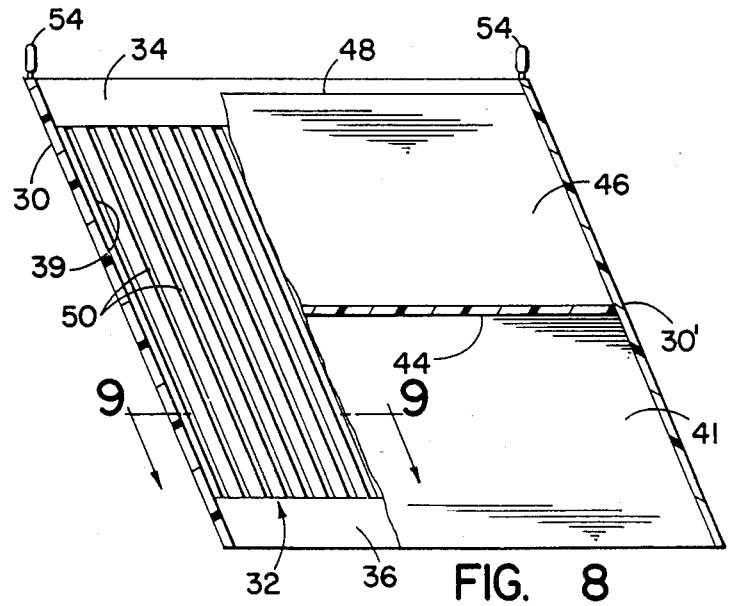
FIG. 8 is a sectional view taken along the line 8—8 of FIG. 5, a portion of the weir shown broken away to reveal structure therebehind.

Front and rear portions of the chamber 40 are separated by a weir 46 which, as shown, is formed by an upper portion of the inclined wall 41. The weir 46 extends transversely between the sidewalls 30, 30', as best shown in FIGS. 3 and 8, and has an upper edge 48 spaced some distance below the upper edges of the sidewalls 30, 30'. Communication between the interstices defined by the sidewalls 30, 30' and the plates 38, 38 is provided by the openings or slots 50, 50 formed in the partition 32, as shown in FIGS. 8 and 9. It should be noted that the upper ends of the slots 50, 50 are disposed some distance below the level of the weir upper edge 48.

A conduit connection or drain fitting 52, which, as shown, is joined to the bottom wall 44, communicates with the front portion of the chamber 40 to provide a liquid flowpath from the chamber. Fastening rings or eyes 54, 54 are secured in a suitable manner to the module to facilitate lifting and lowering it to and securing it in a desired position within an existing liquid clarifying apparatus, such as the apparatus 12 hereinbefore described.

In accordance with a method for practicing the invention, one or more clarifier modules 14 are positioned in an existing clarifying apparatus, such as the apparatus 12. The number of modules employed may, of course, be determined by the size of the existing clarifying apparatus and the degree of improvement which is desired to be achieved. However, for clarity of illustration, a single module is shown.

Referring again to FIG. 1, the module 14 is preferably positioned within the tank 16 near the outer periphery of the tank. More specifically, the module is disposed within the tank in a level or substantially horizontal position. The weir upper edge 48 is disposed a short distance below the surface of the waste effluent. In a typical module construction the weir upper edge 48 is disposed approximately 3 inches below the upper edge of the module. When such a module is positioned within a clarifying apparatus tank, such as the apparatus 12, the upper edge of the module is preferably positioned approximately 1½ inches above the surface of the waste effluent in the tank whereas the weir upper edge 48 is disposed approximately 1½ inches below the surface of the waste effluent. The module is preferably anchored in position within the clarifying apparatus 12 by cables or rods, such as indicated at 56, 56, attached to a supporting structure, such as the bridge 22.

In the embodiment 10 shown in FIG. 1, a substantial portion of the tank 16 is located above ground level. To operate the module 14, effluent is withdrawn from the clarified effluent chamber 40 through a discharge conduit or drain line 58 connected to the drain fitting 52. The illustrated drain line 58 extends through a sidewall of the tank 16 and which may be provided with a control valve 60, as shown. Since a substantial portion of the tank 16 is located above ground level, the drain line 58 may be arranged to provide a gravity flowpath from the clarified effluent chamber 40 through a wall of the tank 16 to a location outside of the tank where the clear effluent may be discharged, collected, or fed to another system (not shown), as may be desired. The valve 60 may be adjusted to control the rate of clear effluent discharge.

Waste effluent flows into the module through its open rear end and flows through the spaces between adjacent sloping plates 38, 38 and the sidewalls 30, 30' and associated outboard plates. Solid particles settle on the upper surfaces of the plates 38, 38, slide downward on the plates, leave the module through its open lower end, and ultimately settle to the bottom of the tank 16 to be raked toward the center of the tank and removed through the sludge discharge line 26. The upper baffles 34, 34 trap flocs, oil, or other buoyant materials and prevent these materials from flowing over the weir. The upper and lower baffles also function to define quiescent zones above and below the plates 38, 38 which improve laminar flow through the module. The rate of flow through the module 14 is controlled, in this instance by the regulator valve 60, so that the performance of the module is relatively uneffected by surges or other changes in process flow rate through the clarifier apparatus 12. Since the settling region defined by the plates 38, 38 is open at its rear and bottom ends, the functioning of the module is independent of the size or shape of the surrounding vessel in which it is contained.

Referring now to FIG. 10, another apparatus embodying the invention is indicated generally at 10a. The apparatus 10a is similar in most respects to the apparatus 10, previously described, and includes an existing liquid clarifying apparatus 12a and at least one clarifier module indicated generally at 14a. The module 14a is identical in most respects to the module 14, previously described, however, it differs from the module 14 in that the discharge or drain line 58a is connected to the clear effluent chamber 40a and is arranged to discharge clear effluent from the chamber directly into the same trough 18a which collects clear effluent from the clarifying apparatus 12a. A valve 60a associated with the drain line 58a permits withdrawal of clear effluent from the module 14a at a controlled rate.

Referring now to FIG. 11, another apparatus embodying the present invention is indicated generally at 10b. The apparatus 10b is substantially identical to the apparatus 10, but illustrates another arrangement for withdrawing clear effluent from the clear effluent chamber 40b. Specifically, a drain line or siphon 58b is attached to the drain outlet 52b on the module 14b for siphoning liquid from the module and discharging it externally of the tank 16b. A regulator valve 60b associated with the siphon line 58b allows the clear effluent to be siphoned from the chamber 40b at a controlled rate.

Yet another apparatus embodying the present invention and illustrating another method of the invention is shown in FIG. 12 and indicated generally at 10c. The apparatus 10c is similar to the apparatus 10, previously described, and includes a clarifier module 14c. However, the module 14c differs from the module 14 of the previously described embodiment in that it does not include a conduit connection or drain fitting which communicates with the front portion of the chamber 40c. Clear effluent is withdrawn from the chamber 40c at a controlled rate through a discharge conduit or drain line 58c by an associated pump 62.

While the module of the present invention is particularly adapted for use in combination with an existing clarifying apparatus, as previously described, it should also be understood that one or more modules embodying the invention may be used in combination with any suitable waste effluent tank to clarify waste effluent in accordance with the aforedescribed methods of the invention.

I claim:

1. The combination comprising a liquid clarifying apparatus and at least one clarifier module, said liquid clarifying apparatus having a tank containing waste effluent, means for supplying waste effluent to said tank, means for discharging clarified liquid from the tank, and means for removing sludge from a lower portion of the tank, said one clarifier module disposed within said tank and having a settling region partially defined by a plurality of parallel spaced apart and vertically inclined plates, means defining a clarified effluent chamber forward of said settling region, means for separating said chamber from said region, means providing fluid communication through said separating means between each said settling region and a rear portion of said chamber, a weir within said chamber and separating a front portion of said chamber from said rear portion thereof, means for maintaining said clarifier module within said tank with said weir disposed below the level of the waste effluent in said tank, and means for withdrawing clarified effluent from said front portion and discharging it externally of said tank.

2. The combination as set forth in claim 1 wherein said withdrawing means comprises means for providing a gravity flow path for the flow of clarified effluent from said front portion.

3. The combination as set forth in claim 2 wherein said means providing said gravity flow path comprises a conduit communicating with said front portion and extending through a wall of said tank.

4. The combination as set forth in claim 1 wherein said means for withdrawing means comprises a pump.

5. The combination as set forth in claim 1 wherein said withdrawing means comprises a siphon.

6. The combination as set forth in claim 1 wherein said withdrawing means is further characterized as means for withdrawing clarified effluent from said front portion at a controlled rate.

7. The combination as set forth in claim 6 wherein said means for withdrawing clarified effluent at a controlled rate includes a valve.

8. The combination as set forth in claim 6 wherein the means for withdrawing clarified effluent at a controlled rate comprises a pump.

9. The combination as set forth in claim 1 wherein said separating means comprises a partition at the forward ends of said plates and defining a rear wall of said chamber and said means providing fluid communication through said separating means comprises at least one opening through said partition.

10. The combination as set forth in claim 9 wherein said one opening comprises a slot.

11. The combination as set forth in claim 10 wherein the upper edge of said one slot is located at a level below the upper edge of said weir.

12. The combination as set forth in claim 1 wherein said separating means comprises a partition defining a rear wall of said chamber and said means providing fluid communication comprises a plurality of slots formed in said partition and communicating with the interstices between said plates.

13. The combination as set forth in claim 1 wherein said one clarifier module has an open upper end and said maintaining means comprises means for maintaining said open upper end above the level of the waste effluent in said tank.

14. The combination as set forth in claim 1 wherein the said one clarifier module has a horizontal surface area substantially smaller than the horizontal surface area of the waste effluent in said tank.

15. A method for improving the performance of a liquid clarifying apparatus having a tank for receiving and containing a quantity of waste effluent, said method comprising the steps of providing at least one clarifier module having a settling region partially defined by a plurality of parallel spaced apart and vertically inclined plates, means defining a clarified effluent chamber forward of said settling region, means for separating said chamber from said separating region, means providing fluid communicating through said separating means between said settling region and the rear portion of said chamber, and a weir within said chamber and separating a front portion of said chamber from said rear portion thereof, positioning said one module within said tank with said weir disposed below the level of liquid within said tank, withdrawing clarified effluent from the front portion of said chamber, and discharging the clarified effluent withdrawn from said front portion externally of said tank.

16. The method set forth in claim 15 wherein the step of withdrawing clarified effluent is further characterized as withdrawing clarified effluent at a controlled rate.

17. The method as set forth in claim 16 wherein the step of withdrawing is further characterized as pumping clarified effluent from said front portion.

18. The method as set forth in claim 15 wherein the step of withdrawing clarified effluent is further characterized as inducing gravity flow of clarified effluent from said front portion of said chamber.

19. The method as set forth in claim 15 wherein said step of withdrawing clarified effluent is further characterized as siphoning clarified effluent from the front portion of said chamber.

20. A liquid clarifier module comprising a plurality of parallel spaced apart and vertically inclined plates defining a settling region, means defining a clarified effluent chamber forward of said settling region and including means defining a partition at the forward edges of said plates and a forming rear wall of said chamber, at least one opening through said rear wall associated with a pair of adjacent plates and providing fluid communication between the rear portion of said chamber and the interstices between said adjacent plates, means defining a weir within said chamber and separating a front portion of said chamber from said rear portion thereof, and conduit means communicating with the front portion of said chamber for providing a fluid flow path from said front portion.

21. A clarifier module as set forth in claim 20 wherein said one opening comprises a slot.

22. A clarifier module as set forth in claim 20 wherein the upper end portion of said slot is disposed at a level below the upper edge of said weir.

23. A clarifier module comprising a pair of parallel transversely spaced apart and vertically inclined sidewalls, a longtudinally spaced series of upper baffles connected to upper marginal portions of said sidewalls and extending transversely therebetween, a longitudinally spaced series of lower baffles connected to lower marginal portions of said sidewalls and extending transversely therebetween, a plurality of transversely spaced apart inclined plates disposed between said sidewalls and supported by and extending between said upper and lower baffles in parallel relation to said sidewalls, the forward end portions of said plates cooperating with said sidewalls and associated upper and lower partitions to define a slotted partition, said plates and said sidewalls defining a settling region of said module, means defining a clear effluent chamber forward of said settling region and including an inclined wall forward of said slotted partition and extending forwardly and upwardly from said associated lower baffle, a bottom wall spaced above the lower edges of said sidewalls and extending between said sidewalls and a front wall extending upwardly from said bottom wall between said sidewalls, and a weir disposed within said clear effluent chamber and separating a forward portion of said chamber from a rear portion thereof, said weir having an upper edge spaced below the upper edges of said front wall and said sidewalls.

24. A clarifier module as set forth in claim 23 wherein said weir is defined by an upper portion of said inclined wall.

* * * * *